J. McANESPEY.
Ice-Cream Freezer.

No. 217,130. Patented July 1, 1879.

WITNESSES:
Chas. Nida
C. Sedgwick

INVENTOR:
J. McAnespey
BY Munn & Co
ATTORNEYS.

UNITED STATES PATENT OFFICE.

JOHN McANESPEY, OF PHILADELPHIA, PENNSYLVANIA.

IMPROVEMENT IN ICE-CREAM FREEZERS.

Specification forming part of Letters Patent No. 217,130, dated July 1, 1879; application filed April 17, 1879.

*To all whom it may concern:*

Be it known that I, JOHN McANESPEY, of Philadelphia, in the county of Philadelphia and State of Pennsylvania, have invented a new and useful Improvement in Ice-Cream Freezers, of which the following is a specification.

Figure 1:
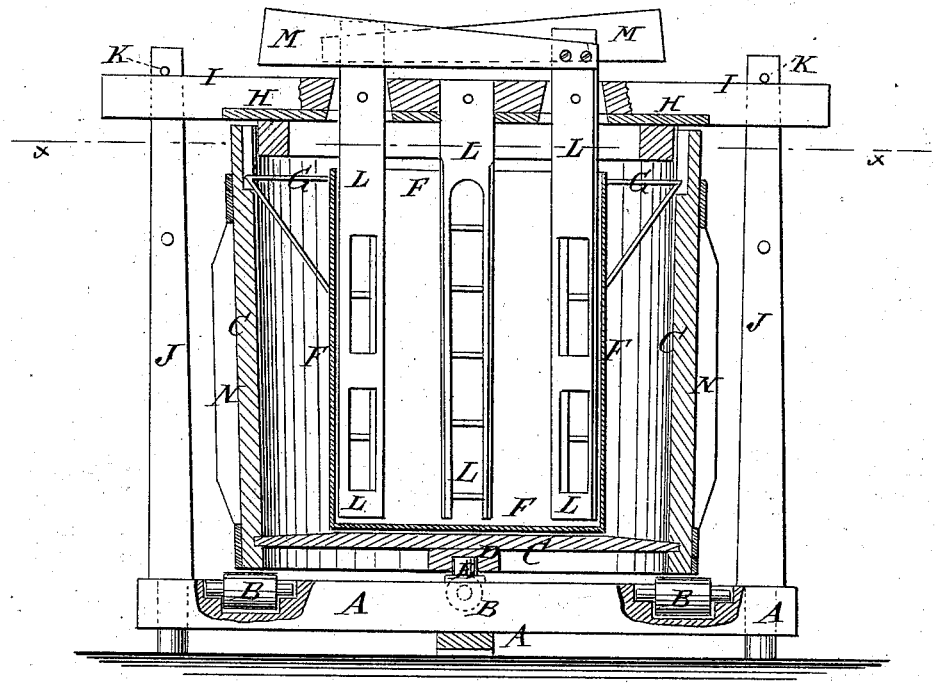
Figure 2:
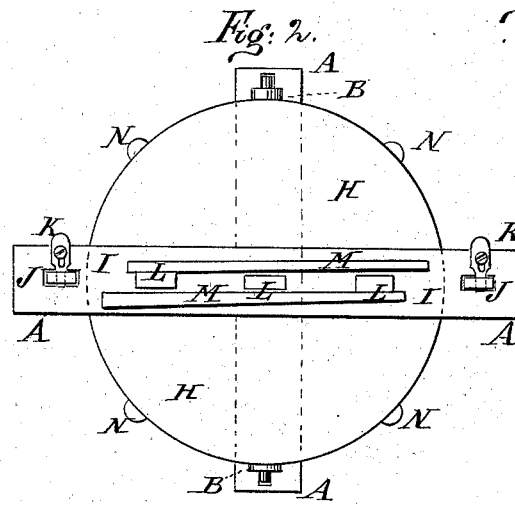
Figure 3:
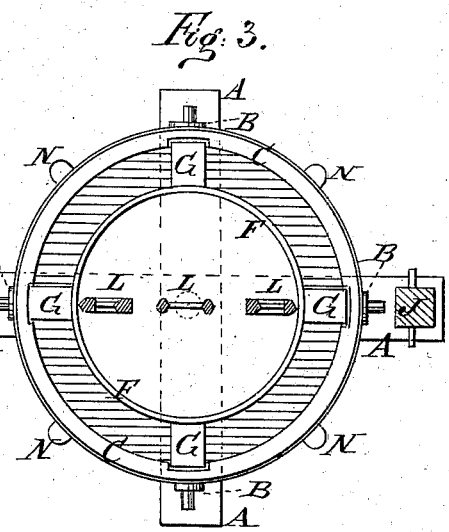

Figure 1 is a vertical section of my improved ice-cream freezer. Fig. 2 is a top view of the same. Fig. 3 is a horizontal section of the same, taken through the line $x\,x$, Fig. 1.

Similar letters of reference indicate corresponding parts.

The object of this invention is to furnish an improved ice-cream freezer which shall be simple in construction, convenient in use, and effective in operation, freezing the cream quickly and evenly.

The invention consists in the combination of the uprights, provided with slots and cross-pins, and the bars, attached at their outer ends to the projecting upper ends of the side uprights, with the inner rotating vessel and the stationary cover and cross-bar, as hereinafter fully described.

A is the base-frame of the machine, which is formed of two bars, crossing each other at their centers, and framed to each other, so that their upper sides may be in the same horizontal plane. In recesses in the upper sides of the bars A are pivoted the small rollers B, upon which rests the lower edge or chine of the tub or vessel C. To the center of the bottom of the vessel C is attached a socket, D, to receive the pivot E, attached to the center of the base-frame A.

The vessel C may be made cylindrical or flaring, and within it is placed the vessel F, which receives the cream to be frozen.

The vessel F is kept in the center of the vessel C by four brackets, G, attached to its upper part, and the outer ends of which enter notches in the inner surface of the upper part of the outer vessel, C, so that there may be an equal thickness of ice upon all sides of the said inner vessel, F.

H is the cover, which is rabbeted or has a ring-flange attached to it to fit into the mouth of the vessel C and keep it in place upon the said vessel. To the cover H is attached a cross-bar, I, the ends of which project so as to be over the ends of one of the bars of the base-frame A. In the ends of the cross-bar I are formed holes to receive the upper ends of the two posts J, the lower ends of which are attached to the ends of the base-bar A.

The upper ends of the posts J have holes formed through them to receive the bolts K, which have short slots formed in them to receive the screws by which they are secured to the upper side of the cross-bar I, so that they may be inserted in and withdrawn from the holes in the posts J, to fasten and release the cover H without being detached from the said cross-bar I.

L are three uprights, which pass down into the interior of the inner vessel, F, and are slotted longitudinally, and are provided with cross-pins, so that they may act as stirrers to agitate the cream while being frozen. The upper end of the central upright L is inserted in a hole in the cover H and cross-bar I, and is secured in place by a pin. The upper ends of the side uprights L, which are placed close to the sides of the vessel F, are inserted in short slots in the cover H and cross-bar I, and are secured by cross-pins, so that they may have a lateral play.

The upper ends of the side uprights L project above the cross-bar I, and to them are attached the outer ends of the two bars M, which project inward along the upper side of the cross-bar I, so that their weight may hold the uprights L pressed outward against the sides of the inner vessel, F, to cause them to act as scrapers to prevent the cream from freezing fast to the said sides.

The side uprights L may be swung inward by raising the free ends of the bars M.

To the sides of the outer vessel, C, are attached upright ribs or cleats N, for the operator to take hold of to turn the vessels C F, the uprights L remaining stationary.

Having thus described my invention, I claim as new and desire to secure by Letters Patent—

The combination of the uprights L, provided with slots and cross-pins, and the bars M, attached at their outer ends to the projecting upper ends of the side uprights L, with the inner rotating vessel, F, and the stationary cover and cross-bar H I, substantially as herein shown and described.

JOHN McANESPEY.

Witnesses:
WILLIAM H. LAMB, Sr.,
WILLIAM H. LAMB, Jr.